United States Patent [19]
Urban

[11] 3,779,804
[45] Dec. 18, 1973

[54] ELECTRODES FOR CERAMIC BODIES

[75] Inventor: Stephen F. Urban, Erie, N.Y.

[73] Assignee: National Lead Company, New York, N.Y.

[22] Filed: Dec. 30, 1970

[21] Appl. No.: 102,632

[52] U.S. Cl.............. 117/212, 117/217, 117/227, 252/512, 252/518, 317/234 J, 317/234 M
[51] Int. Cl........................... B44d 1/18, C23b 5/64
[58] Field of Search............ 117/212, 217, 227, 123; 106/1, 286; 252/518, 512; 317/234 J, 234 M

[56] References Cited
UNITED STATES PATENTS

| | | | |
|---|---|---|---|
| 3,522,487 | 8/1970 | Hessinger......................... | 317/234 J |
| 3,497,774 | 2/1970 | Hornberger et al............. | 317/234 J |
| 3,483,610 | 12/1969 | Campo........................... | 317/234 M |
| 3,421,937 | 1/1969 | Rheinberger.................... | 117/217 |
| 3,377,697 | 4/1968 | Hobbs............................. | 117/217 |
| 3,248,251 | 4/1966 | Allen.............................. | 106/286 |
| 3,589,939 | 6/1971 | Ono et al........................ | 117/217 |

*Primary Examiner*—Alfred L. Leavitt
*Assistant Examiner*—M. F. Esposito
*Attorney*—Ashlan F. Harlan, Jr.

[57] ABSTRACT

Inexpensive, solderable ohmic electrodes are produced on a semiconductive ceramic body by applying to each of the opposite faces of said body a coating of a liquid composition which consists of the reaction product of fine aluminum powder and an aqueous vehicle which contains a phosphate-chromate reaction product, drying said coatings and maturing them by heating said body in air to a temperature from about 590° to 950° C and thereafter applying, to at least a portion of the areas coated by said matured composition, a silver electrode paste and refiring said body at a lower temperature.

7 Claims, 1 Drawing Figure

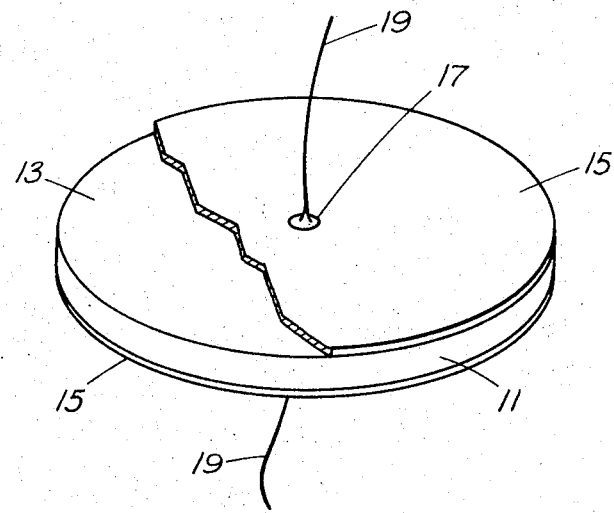

ELECTRODES FOR CERAMIC BODIES

BACKGROUND OF THE INVENTION

Ceramic bodies are extensively used in electronics. Dielectric ceramic bodies are employed as capacitors and piezoelectric elements and semiconducting ceramic bodies are used as rectifiers and thermisters. In the use of such ceramic bodies, one of the recurring problems is their incorporation in electrical circuits and apparatus. Suitable electrodes are in many cases expensive since they require metals such as silver, platinum, gold, and palladium. Moreover, in some instances, particularly with semiconductive ceramic bodies, such metals do not provide ohmic contacts on the bodies, i.e., the resistance between the electrodes on opposite faces of the bodies is much greater than the inherent resistance of the bodies as measured, for example, with indium-gallium electrodes. In some cases, the resistance between applied metal electrodes can be as great as $1 \times 10^4$ times the inherent resistance of the bodies. This problem can be solved by the use of indium-gallium electrodes on the ceramic bodies, but it is impossible to solder leads to such electrodes and the usefulness of ceramic bodies with such electrodes as components in electrical circuits is, therefore, very limited. Other attempts have been made to solve the problem, but the solutions have generally been unduly expensive or so subject to variation because of minor differences in fabrication as to be impractical.

SUMMARY OF THE INVENTION

It has now been discovered that n-type semiconductive ceramic bodies such as those, for example, consisting essentially of lanthanum doped barium titanate and semiconductive ceramic bodies of the PTC (positive temperature coefficient) type may be provided with adherent, solderable, ohmic electrodes which are very inexpensive. Such electrodes are produced by coating the desired surfaces of the ceramic bodies with a liquid composition consisting of the reaction product of aluminum powder and an aqueous vehicle which contains a phosphate-chromate reaction product. After the coating is applied, which may conveniently be accomplished by brushing or spraying, it is dried and fired in an oxidizing atmosphere, such as air to a temperature in the range from about 590° C to about 950° C. The resulting electrodes may, with considerable difficulty, have leads soldered thereto with an aluminum solder. However, leads may be more readily applied, even by such automated processes as dip soldering, while the electrodes remain ohmic in character if at least a small area on each electrode is provided with an overlying silver layer. This may be produced by applying to the exposed surface of the electrodes a conventional silver electroding paste and firing the bodies again in the temperature range from about 650° C to about 760° C.

SHORT DESCRIPTION OF THE DRAWING

The single drawing FIGURE shows, somewhat schematically, a thermistor having electrodes thereon and leads soldered thereto by means of silver spots on the electrodes.

PREFERRED EMBODIMENTS OF THE INVENTION

EXAMPLE 1

A disc approximately 12.5 mm in diameter and about 1.6 mm thick is formed of a conventional barium titanate composition containing 0.78 mol percent lanthanum as a dopant. A semiconductive body is produced when the disc is fired at approximately 1,400° C in air and then cooled. The opposite flat faces of the fired disc are painted with a composition consisting of 80 parts aluminum powder dispersed in an aqueous slurry containing $H_3PO_4$ — 32.3 parts, $CrO_3$ — 9.1 parts, MgO—7.1 parts, and sufficient water to allow reaction of the ingredients and permit easy application of the slurry to the semiconductive body.

The coated disc, after drying, is fired to 705° C in an oxidizing atmosphere to mature said coatings and then cooled. The electrodes thus formed on the flat faces of the disc are found by test to be of low resistance, i.e., ohmic. The electrodes are then made readily solderable by applying to a small spot, about 6 mm in diameter, on each electrode face a small amount of a conventional silver electrode paste and refiring the discs in an oxidizing atmosphere at a temperature of about 650° C. The resultant electroded discs are found to still have ohmic contact characteristics.

It has been found that electrodes applied as described above have excellent adherence to the bodies and that no difficulty is encountered from leads coming loose from bodies to which they are soldered through such electrodes. Results substantially the same as those above described are obtained when the described electroding process is employed with other semiconductive barium titanate bodies.

The drawing illustrates the product resulting from the foregoing example, the barium titanate body 11 having on each face 13 an electrode 15 according to the present invention. Small spots of silver 17 on the respective electrodes provide soldering points for the leads 19.

The phosphate-chromate reaction product used in forming the electrodes according to the invention may vary considerably in composition. In a simple form, as in the preceding example, it is formed from MgO, $H_3PO_4$, and $CrO_3$. However, as illustrated in Example 2, instead of employing phosphoric acid, metal phosphates such as aluminum phosphate and iron phosphate may be substituted in whole or in part for the acids. Further, such soluble chromates as sodium chromate and sodium dichromate may be used instead of chromic oxide. Moreover, magnesium hydroxide and carbonate and the oxides, hydroxides, and carbonates of the alkaline earth metals, aluminum and iron may be substituted for or used with the magnesium oxide. The exact nature of the reaction products formed is not known, but obviously, will vary greatly according to the reactive ingredients employed.

Te relative amounts of the reactive ingredients of the slurry may also be widely varied. It is desirable, however, to maintain the atomic ratio of chromium to phosphorus in the slurry between about 0.3 : 1 and about 0.75 : 1, the atomic ratio of the total of magnesium and any substituent therefor to phosphorus between about 0.5 : 1 and about 1.1 : 1, and the atomic ratio of the total of magnesium and any substituent therefor to chromium between about 1.0 : 1 and about 2.5 : 1. In the appended claims, the total of magnesium and any substituent therefore is referred to as (Mg) for convenience.

The aluminum powder used may be of commercial purity and should be quite finely divided. It should all pass through a 325 mesh sieve and should preferably have a particle size between 5 μ and 20 μ. The proportion of aluminum powder employed may vary within wide limits. Preferably, however, a weight ratio of from about 3.5 : 1 to about 5.0 : 1 of aluminum with respect to the solid ingredients of the vehicle is used.

Another illustration of the present invention is set forth in the following example.

EXAMPLE 2

A disc of a fired barium titanate semiconductive body is coated on its opposite flat faces with a composition made by mixing together 9.8 parts $H_3PO_4$, 12.2 parts of aluminum phosphate, 10 parts of $CrO_3$, and 70 parts of aluminum powder, with sufficient water to permit reaction of the ingredients and make the resulting slurry readily appliable. After firing the coated disc to 700° C the resulting matured electrodes are found to show no resistance when measured with an ohmmeter and the resistance of the electroded body measured through the electrodes is substantially the same as the resistance of the body before electroding, as determined by indium-gallium electrodes.

After small spots on the electroded faces are provided with a coating of a conventional silver electroding paste and the body is refired at 1,200° F, leads can be readily soldered to such spots.

It will be noted in the preceding example that the aluminum phosphate used is the equivalent of a mixture of aluminum hydroxide and phosphoric acid for purposes of determining the atomic ratios discussed above.

The electroding composition may be applied to the ceramic body in any convenient manner, e.g., by spraying or painting. The firing temperature employed in providing electrodes with compositions according to the invention may vary from 590° C to about 950° C, but is preferably in the range from about 675° C to about 820° C, and the firing should be in an oxidizing atmosphere such as air.

In the step of applying the coating or layer of silver electroding paste, any desired or convenient method may be employed. The silver may, of course, be applied over the entire electroded surfaces of the ceramic body but, as pointed out above, only a very small silvered area is required. In general, an area of about 25 mm² is sufficient and in some cases even smaller silvered areas are possible. The refiring of the silvered body may be at a temperature such as is conventionally used for firing on silver electrodes, i.e., from about 650° C to about 710° C. Best results are usually obtained, however, if such refiring is at a temperature lower than the temperature at which the base electrode was fired. As previously stated, any conventional silver electroding paste, many of which are commercially available, can be used.

It will be seen from the foregoing description that the present novel process permits the manufacture of n-type semiconductive barium titanate products with electrodes thereon which are not only inexpensive, but which also are solderable and ohmic. As used herein, an "ohmic" electrode is one in which the resistance through the body to which the electrode is applied is substantially the same when measured through the applied electrodes as when measured without the electrodes.

In the hereindescribed compositions, parts are parts by weight. Sieves referred to are U. S. Standard.

I claim:

1. A process for providing a semiconductive ceramic body with solderable, ohmic electrodes on opposite faces thereof which comprises: applying to each of said faces a coating of a liquid composition consisting essentially of the reaction product of aluminum powder and an aqueous vehicle which contains a phosphate-chromate-(Mg) reaction product, said last-mentioned reaction product having an atomic ratio of Cr to P between about 0.3:1 and about 0.75:1, an atomic ratio of (Mg) to P between about 0.5:1 and about 1. 1:1, and an atomic ratio of (Mg) to Cr between about 1. 0:1 and about 2.5:1, (Mg) being the total of magnesium and any substituent therefore; drying said coatings; heating said coated body in an oxidizing atmosphere to a temperature in the range from about 590° C to about 950° C whereby to mature said coatings and provide ohmic contact of said coatings with said body; applying to at least a portion of the surface of said matured coating on each face of said body a coating of a silver electroding paste; and refiring said body, thereby providing solderable, ohmic electrodes on said body.

2. A process as set forth in claim 1 in which said aluminum powder is present in a weight ratio of from about 3.5 : 1 to about 5.0 : 1 with respect to the solid ingredients of said vehicle.

3. A process as set forth in claim 1 in which said body is refired after application of the silver electroding paste at a temperature less than the temperature at which said coating of said liquid composition is matured.

4. A process as set forth in claim 3 in which said coating of said liquid composition is matured by heating to a temperature in the range from about 675° C to about 820° C.

5. A process as set forth in claim 2 in which said body is refired after application of the silver electroding paste at a temperature less than the temperature at which said coating of said liquid composition is matured.

6. A process as set forth in claim 5 in which said coating of said liquid composition is matured by heating to a temperature in the range from about 675° C to about 820° C.

7. A semiconductive ceramic body having solderable, ohmic electrodes on opposite faces thereof characterized in that said electrodes are produced by applying to said faces coatings of a liquid composition consisting essentially of the reaction product of aluminum powder with an aqueous vehicle which contains a phosphate-chromate-(Mg) reaction product, said last-mentioned reaction product having an atomic ratio of Cr to P between about 0.31:1 and about 0.75:1, an atomic ratio of (Mg) to P between about 0.5:1 and about 1.1:1, and an atomic ratio of (Mg) to Cr between about 1. 0:1 and about 2. 5:1, (Mg) being the total of magnesium and any substituent therefor, drying said coatings, then firing said coated body, to mature said coatings, in an oxidizing atmosphere to a temperature in the range from about 590° C to about 950° C, and subsequently providing a silver coating over a portion of each of the electrode-coated surfaces.

* * * * *